(12) United States Patent
Lee et al.

(10) Patent No.: US 10,032,593 B1
(45) Date of Patent: Jul. 24, 2018

(54) ELECTRON GENERATION APPARATUS

(71) Applicant: GROON CO., LTD., Jeollabuk-do (KR)

(72) Inventors: In Ho Lee, Jeollabuk-do (KR); Young Pyo Hong, Jeollabuk-do (KR); Sang Kun Kim, Gwangju (KR); Seon Hwa Ryu, Jeollabuk-do (KR); Ji Young Park, Jeollabuk-do (KR); Ho Sang Lee, Jeollabuk-do (KR)

(73) Assignee: GROON CO., LTD., Jeollabuk-do (KR)

( * ) Notice: Subject to any disclaimer, the term of this patent is extended or adjusted under 35 U.S.C. 154(b) by 0 days.

(21) Appl. No.: 15/786,728

(22) Filed: Oct. 18, 2017

(30) Foreign Application Priority Data

May 18, 2017 (KR) .................. 10-2017-0061411

(51) Int. Cl.
*H01J 1/02* (2006.01)
*C02F 1/30* (2006.01)

(52) U.S. Cl.
CPC ............ *H01J 1/02* (2013.01); *C02F 1/305* (2013.01)

(58) Field of Classification Search
CPC ...... H01J 1/02; H01J 7/00; H01J 99/00; H01J 37/06; H01J 3/02; H01J 37/32073; H01J 49/163; C02F 1/305; F21K 99/00; H01T 19/00; H01T 19/02; H01T 19/04
See application file for complete search history.

(56) References Cited

U.S. PATENT DOCUMENTS 6,338,347 B1 * 1/2002 Chung ................ A61H 39/002
600/9

FOREIGN PATENT DOCUMENTS

| KR | 10-1999-0007560 | 1/1999 |
|---|---|---|
| KR | 10-0529749 | 11/2005 |
| KR | 10-0537223 | 12/2005 |
| KR | 10-1042141 | 6/2011 |
| KR | 10-1295349 | 8/2013 |
| KR | 10-1303832 | 9/2013 |
| KR | 10-1372432 | 3/2014 |

* cited by examiner

*Primary Examiner* — Joseph L Williams
*Assistant Examiner* — Jose M Diaz

(57) ABSTRACT

The present disclosure relates to an electron generation apparatus including a discharge pin module provided with a support plate, discharge pins coupled to the support plate, and an elastic connection element electrically connecting a group of discharge pins, a discharge plate placed facing the discharge pins, a support structure positioned at an opposite side to the discharge plate with the support plate interposed between, and provided with a coupling plate to which the discharge pin module and the discharge plate are detachably coupled, and a circuit module provided with a main board positioned apart from the coupling plate at an opposite side to the discharge pin module with the coupling plate interposed between and distribution processing boards connected to the main board to apply individual high-voltage high-frequency pulsed power to the group of discharge pins.

9 Claims, 5 Drawing Sheets

ELECTRON GENERATION APPARATUS

CROSS-REFERENCE TO RELATED APPLICATION

This application claims priority of Korean Patent Application No. 10-2017-0061411, filed on May 18, 2017, in the KIPO (Korean Intellectual Property Office), the disclosure of which is incorporated herein entirely by reference.

BACKGROUND OF THE INVENTION

Field of the Invention

The present disclosure relates to an electron generation apparatus, and more particularly, to an electron generation apparatus for use in wastewater treatment, pollutant treatment and odor elimination.

Description of the Related Art

Generally, a typical technology or structure known as generating negative ion under atmospheric pressure condition is corona discharge. The corona discharge technology is designed to induce the generation of corona discharge between each electrode by applying high voltage to the electrodes for each of the corresponding polarities.

The corona discharge generated in this way may be classified into positive corona and negative corona according to the condition of voltage applied to the electrodes for each polarity. Among them, positive corona is more likely to spatially expand than negative corona, but negative corona which generates a greater amount of free electrons and radicals is widely used in the field of industrial equipment.

Further, technology for generating free electron and negative ion is classified into pulsed power, AC power and DC power forms according to the type of power supply to apply power to each electrode. In this instance, conventional ozone generators or negative oxygen ion generators using pulsed power have a pin-plate structure composed largely of discharge pin and ground. The (+) electrode assumes a plate shape and the (−) electrode assumes a pin shape, and when pulsed power is applied to each electrode, a corona discharge is formed, and in this instance, ozone or negative oxygen ion is generated. However, the conventional power generators have a plurality of discharge pins and a complex structure in which power is applied to each discharge pin, resulting in low operation efficiency in replacing the components.

SUMMARY OF THE INVENTION

The present disclosure is directed to providing an electron generation apparatus with a simple structure for applying power and high operation efficiency in maintenance and repair.

To achieve the object of the present disclosure, according to an aspect of the present disclosure, there is provided an electron generation apparatus including a discharge pin module provided with a support plate, discharge pins coupled to the support plate, and an elastic connection element 158 electrically connecting a group of discharge pins including at least two adjacent discharge pins from the discharge pins and coupled to the support plate, a discharge plate placed facing the discharge pins, a support structure positioned at an opposite side to the discharge plate with the support plate interposed between and provided with a coupling plate to which the discharge pin module and the discharge plate are detachably coupled, and a circuit module provided with a main board positioned apart from the coupling plate at an opposite side to the discharge pin module with the coupling plate interposed between, and distribution processing boards connected to the main board to apply individual high-voltage high-frequency pulsed power to the group of discharge pins, wherein the coupling plate is provided with connection protrusions each electrically connected to the distribution processing boards, and an end of the elastic connection element comes into contact with the connection protrusion.

The discharge plate may have through-holes each corresponding to the discharge pins.

The elastic connection element may be a compression coil spring.

The support structure may be further provided with a body which provides an internal space for receiving the discharge pin module and the discharge plate and which has an open top, and the coupling plate may be coupled to the body, covering the open top of the body.

The electron generation apparatus may further include an electromagnetic field generator installed in the internal space of the body to guide movement of electron and radical emitted from the discharge pin.

According to the present disclosure, the aforementioned objects of the present disclosure can be all achieved. Specifically, there is provided an electron generation apparatus including a discharge pin module provided with a support plate, discharge pins coupled to the support plate, and an elastic connection element electrically connecting a group of discharge pins including at least two adjacent discharge pins from the discharge pins and coupled to the support plate, a discharge plate placed facing the discharge pins, a support structure positioned at an opposite side to the discharge plate with the support plate interposed between and provided with a coupling plate to which the discharge pin module and the discharge plate are detachably coupled, and a circuit module provided with a main board positioned apart from the coupling plate at an opposite side to the discharge pin module with the coupling plate interposed between, and distribution processing boards connected to the main board to apply individual high-voltage high-frequency pulsed power to the group of discharge pins, wherein the coupling plate is provided with connection protrusions 146 each electrically connected to the distribution processing boards, and an end of the elastic connection element comes into contact with the connection protrusion, thereby facilitating the assembly and disassembly of the circuit module, the discharge pin module and the discharge plate, and as a consequence, improving the operation efficiency.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
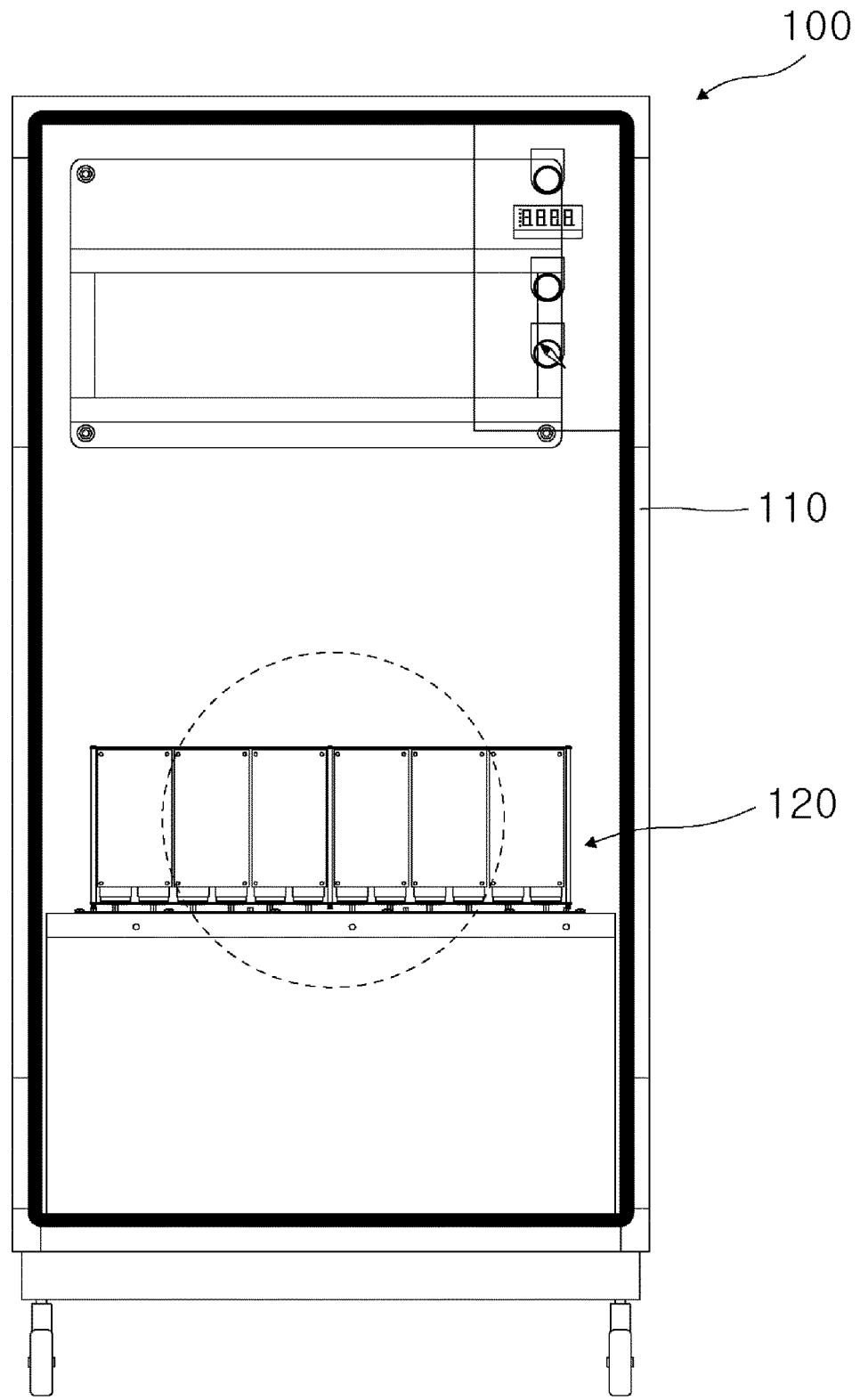
FIG. 1 is a side view of an electron generation apparatus according to an embodiment of the present disclosure, in which internal parts are visible.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIG. 1 is a side view of an electron generation apparatus according to an embodiment of the present disclosure, in which internal parts are visible. Referring to FIG. 1, the electron generation apparatus 100 includes an external case 110, and an electron generator 120 received in the external case 110. A controller to control the electron generator 120 and a power supply to apply power supply are positioned above the electron generator 120 and received in the external case 110 together.

Figure 2:
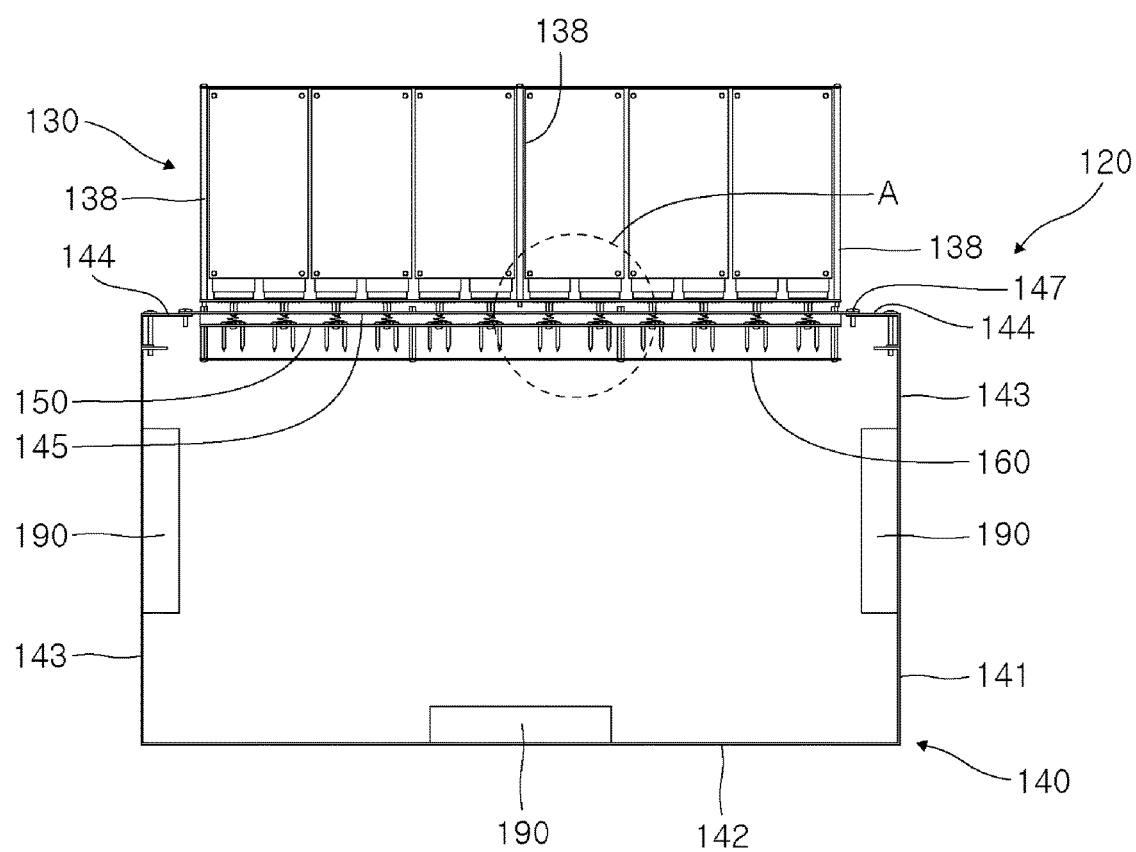
FIG. 2 is an enlarged view of an electron generator in FIG. 1.

FIG. 2 shows the electron generator 120 of FIG. 1. Referring to FIG. 2, the electron generator 120 includes a circuit module 130, a support structure 140, a discharge pin module 150, a discharge plate 160, and electromagnetic field generators 190.

Figure 3:
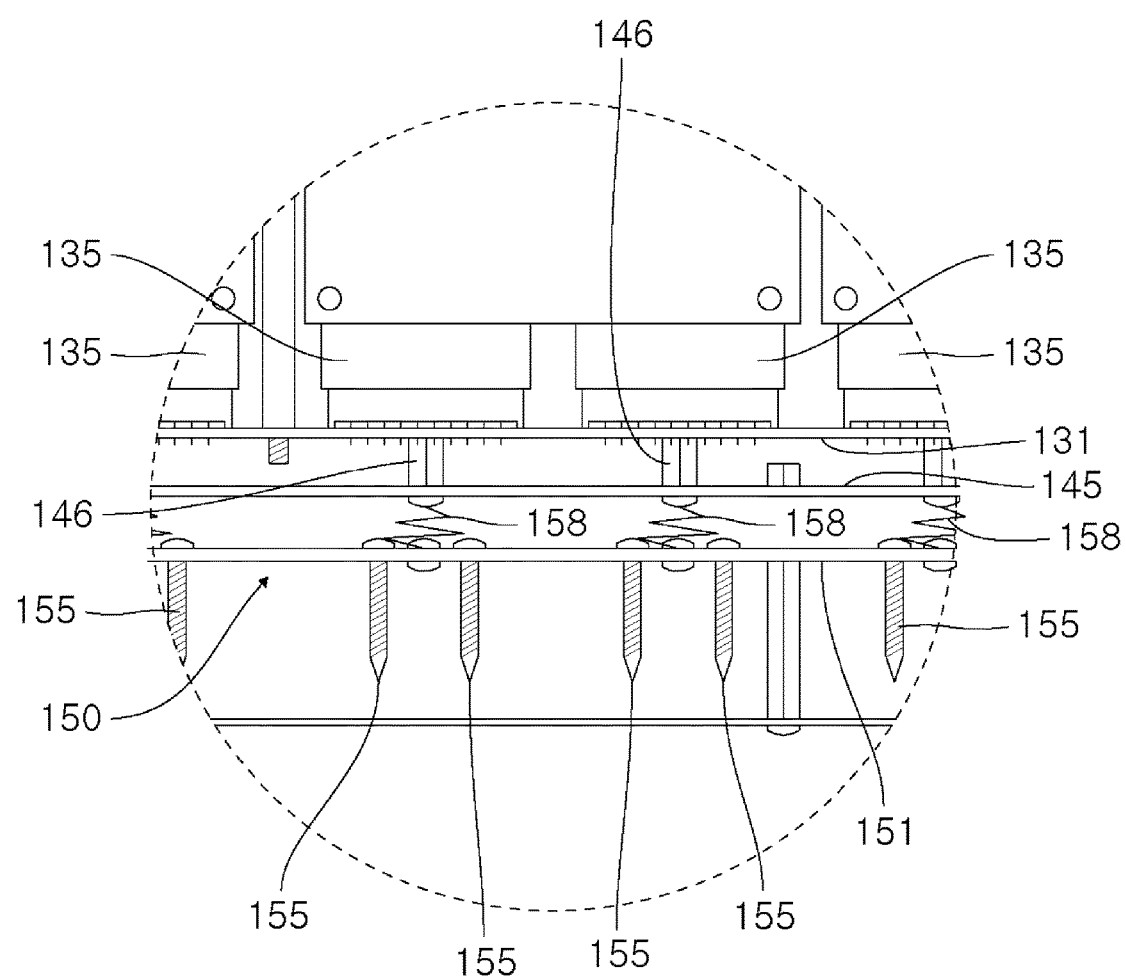
FIG. 3 is an enlarged view of section 'A' in FIG. 2.
Figure 4:
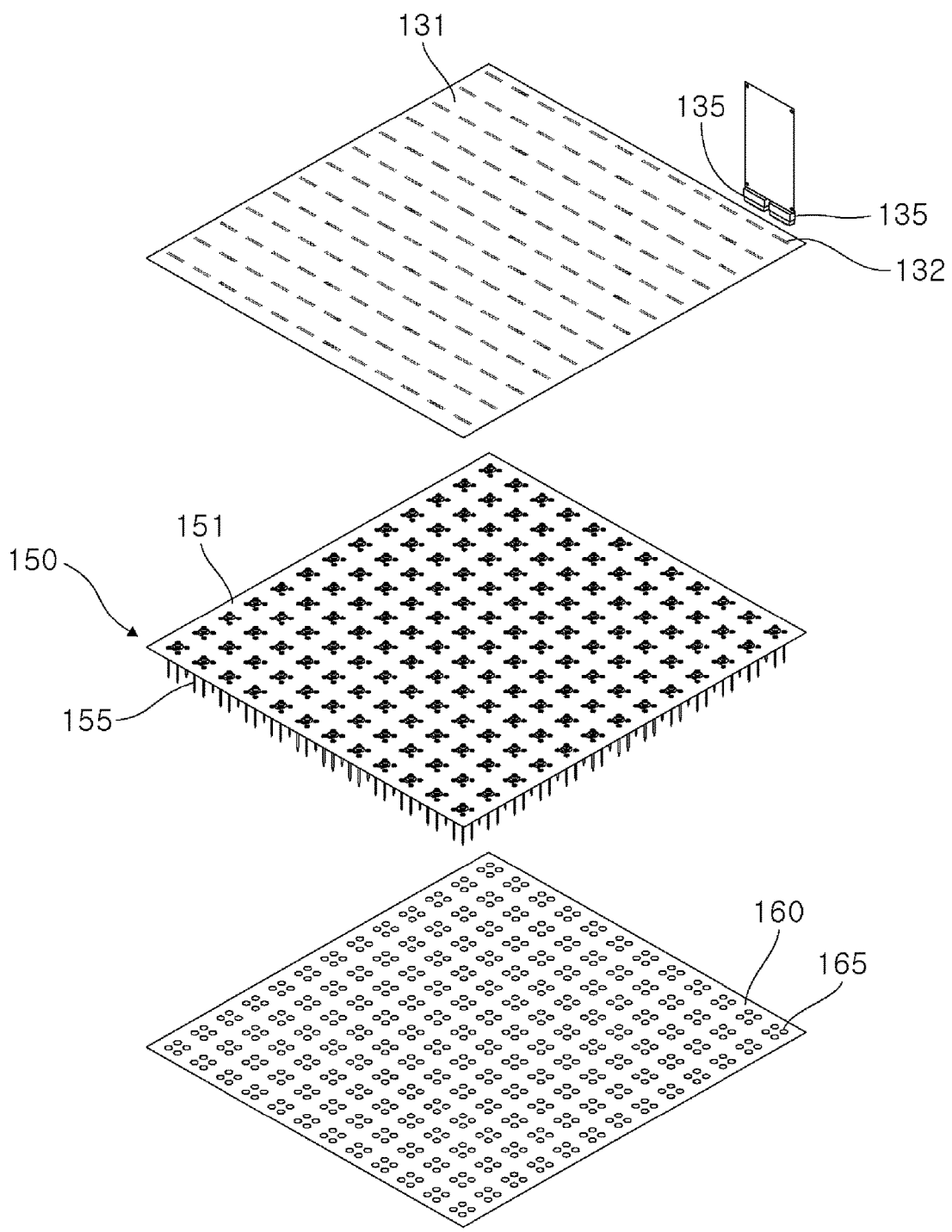
FIG. 4 is an exploded perspective view of a main structure in FIG. 2.
Figure 5:
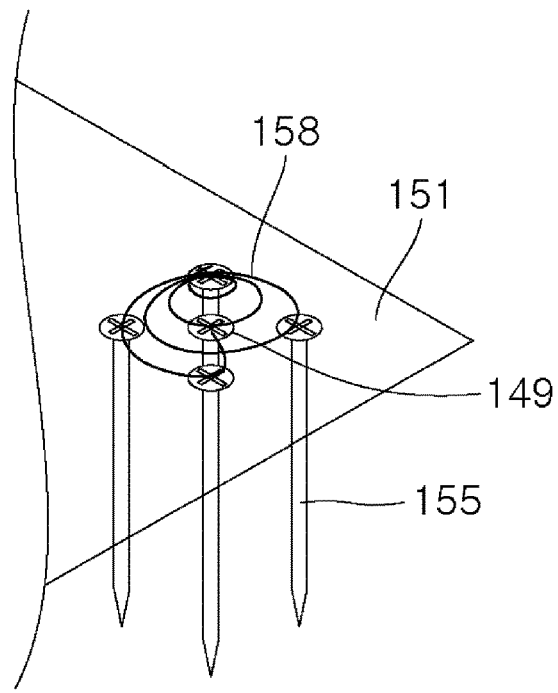
FIGS. 5 and 6 are partial enlarged views of top and bottom of a discharge pin plate show in FIG. 4
Figure 6:
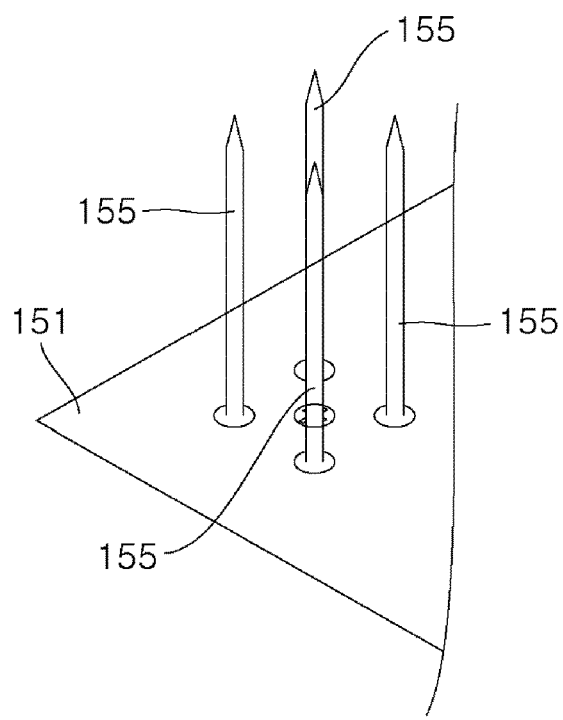

Referring to FIGS. 2-4, the circuit module 130 includes a main board 131, and distribution processing boards 135 connected to the main board 131.

The main board 131 is generally in the shape of a flat plate, and has connectors 132 to which the distribution processing boards 135 are connected. The connectors 132 are spaced apart from each other along the horizontal and vertical directions on the main board 131. The distribution processing boards 135 are positioned on one surface of the main board 131 (upper surface in the drawing).

Each of the distribution processing boards 135 has a stand-alone high-voltage high-frequency pulse transformer circuit to apply individual high-voltage high-frequency pulsed power. The distribution processing boards 135 are each connected to the connectors 132 of the main board 131 on one surface of the main board 131 (upper surface in the drawing).

The main board 131 and the distribution processing boards 135 connected to the main board 131 maintain tight coupling by coupling means 138 to form the integrated circuit module 130. The circuit module 130 is detachably coupled to the support structure 140.

The support structure 140 includes a body 141, and a coupling plate 145 detachably coupled to the body 141. The body 141 includes a bottom plate 142, a sidewall 143 extending from the bottom plate 142, and a flange 144 extending inward from the top of the sidewall 143. The body 141 has an empty space inside, and an inner area of the flange 144 is open. The electromagnetic field generators 190 are installed and positioned on the bottom plate 142 and the sidewall 143 in the internal space of the body 141. Electrons moves downward by the electromagnetic field generators 190 in the internal space of the body 141. The coupling plate 145 is detachably coupled to the flange 144 with coupling means 147 such as a screw, covering the open top of the body 141. The circuit module 130, the discharge pin module 150 and the discharge plate 160 are detachably coupled to the coupling plate 145. The circuit module 130 is positioned outside of the support structure 140 with the coupling plate 145 interposed between, and the discharge pin module 150 and the discharge plate 160 are positioned in the internal space of the body 141. The coupling plate 145 is made of an electrical insulating material, and has connection protrusions 146 corresponding to the distribution processing boards 135 one-to-one. The connection protrusions 146 protrude from the coupling plate 145 toward the corresponding distribution processing boards 135, and are made of an electrical conducting material. The connection protrusions 146 are exposed at the opposite surface facing the discharge pin module 150. Electricity is applied to the discharge pin module 150 by the corresponding distribution processing boards 135 through the connection protrusions 146.

The discharge pin module 150 includes a support plate 151, discharge pins 155 coupled to the support plate 151, and elastic connection elements 158.

The support plate 151 is generally in the shape of a flat plate, and is positioned at a predetermined distance apart from the coupling plate 145 at the opposite side to the main board 131 with the coupling plate 145 interposed between. The support plate 151 is where the discharge pins 155 and the elastic connection elements 158 are coupled to each other.

The support plate 151 is made of an electrical insulating material. However, those of skill in the art will readily recognize, in light of this disclosure, that many different types of materials can be used for the support plate 151.

The discharge pins 155 protrude from the support plate 151 toward the opposite side to the coupling plate 145. The discharge pin 155 is made of an electrical conducting material, and this embodiment describes that the discharge pin 155 is formed of a screw fitted into the support plate 151. The discharge pin 155 or the screw has a head 156 positioned on the side facing the coupling plate 145, and a longitudinally extending body 157 that protrudes longitudinally to the opposite side. Adjacent discharge pins from the discharge pins 155 form a group of discharge pins electrically connected. This embodiment describes that a group of discharge pins include four discharge pins 155, but the present disclosure is not limited thereto. The four discharge pins 155 forming a group of discharge pins are electrically connected to each other by the elastic connection element 158. High voltage from the corresponding distribution processing board 135 is applied to the group of discharge pins.

The elastic connection elements 158 are each fixed to the support plate 151 by fixing means or a fixing screw 149 on the surface of the support plate 151 facing the coupling plate 145. In this embodiment, the elastic connection element 158 is a compression coil spring made of an electrical conducting material. One elastic connection element 158 electrically connects four discharge pins 155 that form a group of discharge pin. The ends of the elastic connection elements 158 are contacted with and electrically connected to the corresponding connection protrusions 146 formed on the coupling plate 145.

The discharge plate 160 is generally in the shape of a flat plate, and is made of an electrical conducting material. The discharge plate 160 is positioned at a predetermined distance apart from the discharge pins 155 in the internal space of the body 141 of the support structure 140. The discharge plate 160 is detachably coupled to the coupling plate 145 by coupling means 170, together with the discharge pin module 150. Corona discharge takes place between the discharge pin 155 and the discharge plate 160, and ionized electrons and radicals emitted from the discharge pin 155 serving as (−) electrode are moved to the discharge plate 160 serving as (+) electrode. The discharge plate 160 has through-holes 165 each positioned at a shortest distance corresponding to the discharge pins 155 one-to-one. In the event that impurities, including dust, from the discharge pins 155 are accumulated on the discharge plate 160 at the initial time of discharge, the through-holes 165 maintain a shortest discharge distance to improve the discharge efficiency.

The electromagnetic field generators 190 are each installed on the bottom plate 142 and the sidewall 143 of the body 141 to move the electrons and radicals emitted from the discharge pins 155 toward the bottom plate 142. Each of the electromagnetic field generators 190 includes a core of stainless steel plated with zinc and a coil wound around the core, and may have any configuration to generate an electromagnetic field.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An electron generation apparatus comprising:
    a discharge pin module comprising:
        a support plate;
        discharge pins coupled to the support plate; and
        an elastic connection element electrically connecting a group of discharge pins including at least two adjacent discharge pins from the discharge pins and coupled to the support plate;
    a discharge plate placed facing the discharge pins;
    a support structure positioned at an opposite side to the discharge plate with the support plate interposed between, and provided with a coupling plate to which the discharge pin module and the discharge plate are detachably coupled; and
    a circuit module comprising:
        a main board positioned apart from the coupling plate at an opposite side to the discharge pin module with the coupling plate interposed between; and
        distribution processing boards connected to the main board to apply individual high-voltage high-frequency pulsed power to the group of discharge pins;
    wherein the coupling plate is provided with connection protrusions each electrically connected to the distribution processing boards, and an end of the elastic connection element comes into contact with the connection protrusion.

2. The electron generation apparatus of claim 1, wherein the discharge plate has through-holes each corresponding to the discharge pins.

3. The electron generation apparatus of claim 1, wherein the elastic connection element is a compression coil spring.

4. The electron generation apparatus of claim 1, wherein the support structure is further provided with a body which provides an internal space for receiving the discharge pin module and the discharge plate, and which has an open top, and the coupling plate is coupled to the body, covering the open top of the body.

5. The electron generation apparatus of claim 4, further comprising:
    an electromagnetic field generator installed in the internal space of the body to guide movement of electron and radical emitted from the discharge pin.

6. An electron generation apparatus comprising:
    a discharge pin module comprising:
        a support plate;
        discharge pins coupled to the support plate; and
        an elastic connection element electrically connecting discharge pins coupled to the support plate;
    a discharge plate placed facing the discharge pins, the discharge plate includes through-holes each corresponding to the discharge pins;
    a support structure positioned at an opposite side to the discharge plate with the support plate interposed between, and provided with a coupling plate to which the discharge pin module and the discharge plate are detachably coupled; and a circuit module comprising:
  a main board positioned apart from the coupling plate at an opposite side to the discharge pin module with the coupling plate interposed between; and
  distribution processing boards connected to the main board to apply individual high-voltage high-frequency pulsed power to the group of discharge pins;
  wherein the coupling plate is provided with connection protrusions each electrically connected to the distribution processing boards.

7. The electron generation apparatus of claim 6, wherein the elastic connection element is a compression coil spring.

8. The electron generation apparatus of claim 6, wherein the support structure is further provided with a body which provides an internal space for receiving the discharge pin module and the discharge plate, and which has an open top, and the coupling plate is coupled to the body, covering the open top of the body.

9. The electron generation apparatus of claim 8, further comprising:
  an electromagnetic field generator installed in the internal space of the body to guide movement of electron and radical emitted from the discharge pin.

\* \* \* \* \*